Figure 1:
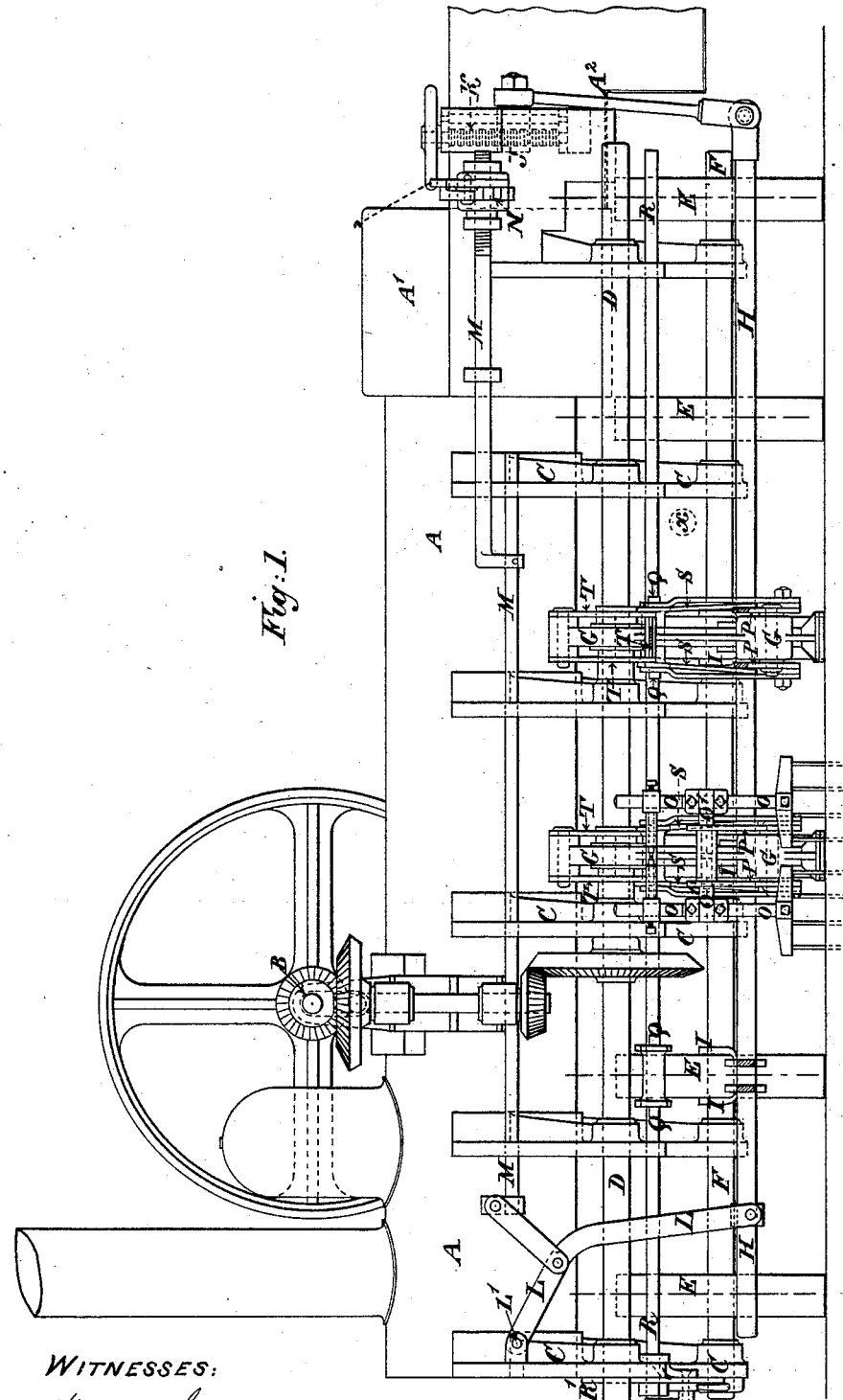

2 Sheets—Sheet 2.

T. C. DARBY.
Cultivator.

No. 225,692. Patented Mar. 23, 1880.

WITNESSES:
Wm. A. Skinkle
Geo. W. Breck

INVENTOR:
Thomas C Darby
By his Attorneys.
Baldwin, Hopkins & Payton

UNITED STATES PATENT OFFICE.

THOMAS C. DARBY, OF PLESHEY LODGE, NEAR CHELMSFORD, ENGLAND.

CULTIVATOR.

SPECIFICATION forming part of Letters Patent No. 225,692, dated March 23, 1880.

Application filed February 23, 1878. Patented in England, July 3, 1877.

*To all whom it may concern:*

Be it known that I, THOMAS CHURCHMAN DARBY, of Pleshey Lodge, near Chelmsford, in the county of Essex, England, have invented or discovered new and useful Improvements in Apparatus for Cultivating Land, which improvements are fully set forth in the following specification, reference being had to the accompanying drawings.

This invention has for its object improvements in apparatus for cultivating land; and, as will hereinafter more particularly be described preparatory to designating what is herein claimed, I construct a steam or power engine (or an implement carrying such an engine) of a width such as will admit of the implement being transported endwise through gateways and being carried conveniently along public roads, and which, when at work, is caused to move sidewise over the land and thus cultivate a broad space at each traverse—a space about corresponding to the length of the implement—by the operation of a series of spades or fork-like tools ranged along one side of the implement. This side of the implement is supported on a number of legs, which terminate at bottom in broad bases or feet. The legs have imparted to them a slight up-and-down and rocking or swinging movement in such manner that when lifted they are rocked forward, and after being lowered have a tendency to rock backward, thus pushing forward the machine by bearing upon the ground. The side of the machine opposite that having the legs is supported on wheels mounted so as to be free to turn independently of each other. The amount of forward-and-backward movement given to the legs is controlled by a rod which passes from one end of the implement to the other and raises or lowers fulcrums upon which the legs can be rocked by eccentrics. By raising or lowering the rod at both ends the fulcrums of the legs are all raised or lowered, and more or less backward-and-forward movement is given to all the legs, while by raising one end of the rod and lowering the other the backward-and-forward movement given to the legs at one end of the implement will be increased, while that given to the legs at the other end will be decreased, and the implement be so caused to move round in a circle.

The eccentrics which give motion to the legs are carried by a shaft which runs from end to end of the implement, and which has a revolving motion transmitted to it from the crank-shaft of the engine. The spades or forks have the requisite movements given to them by the movements of the legs.

The drawings hereunto annexed show a digging implement constructed according to my invention.

Figure 2:
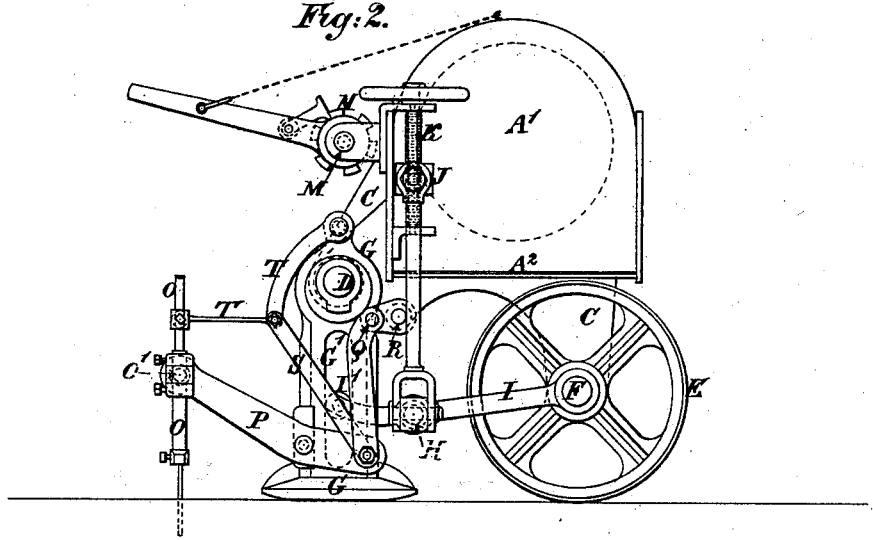
Figure 3:
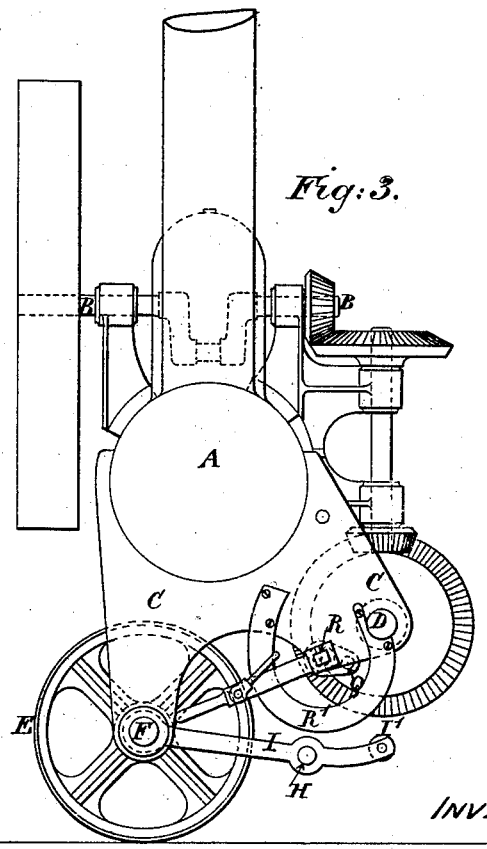

Figure 1 is an elevation of that side of the implement along which the forks or spades are carried. Fig. 2 is an elevation of the fire-box end of the implement, with the platform (upon which the driver or attendant is to stand) removed. Fig. 3 is an elevation of the opposite end of the implement.

In these figures, A is a horizotal steam-boiler of the ordinary type, having mounted on it a steam-engine. (Not shown in the drawings.) The steam-engine drives the crank-shaft B, from which motion is transmitted to the legs and digging-forks, as hereinafter described.

$A'$ is the fire-box end of the boiler, and $A^2$ the platform upon which the driver is to stand. To the side of the shell of the boiler are secured strong brackets C, which carry bearings for the eccentric-shaft D to turn in.

The shaft D runs from end to end of the implement, and has a revolving motion given to it from the crank-shaft B by an intermediate shaft and bevel-wheels, as shown.

The opposite side of the implement to that shown at Fig. 1 is supported upon wheels E, which all turn freely upon a fixed shaft, F, which runs from one end of the implement to the other. The other side of the implement is supported on legs G, which are provided with feet at their lower ends, and at their upper ends embrace the eccentrics on the shaft D.

In the implement shown by the drawings six legs, G, and a corresponding number of wheels, E, are to be used, and the eccentrics are so fixed upon the shaft D as to work the legs in pairs and to cause the pairs of legs to come in succession to their lowest position, so that at one time this side of the implement will be supported on the two central legs, afterward on the legs next to them, and afterward on the two outer legs, and so on in succession.

In each of the legs there is a slot, G', in which is received a roller, I', carried by links I, which are free to turn on the fixed shaft F, upon which the bearing-wheels E are mounted. Extending from one end of the implement to the other is a rod, H, which passes through all of the links I, so that by raising or lowering either end of this rod the rollers I', which form fulcrums for the legs to rock upon, are correspondingly raised or lowered, and the amount of backward-and-forward movement given to the legs can thus be varied, as above explained.

One end of the rod H is connected by a link to a nut, J, which can be raised or lowered by turning the screw K by the hand-wheel on its upper end. The opposite end of the rod H is supported by a hanging link, L, which is free to turn on a fixed pin at L'. The link is coupled by another link to a bar, M, which is led back to the fire-box end of the boiler, and has a screw-thread formed upon it, which screws into a nut, N, which can be revolved, but cannot move endwise.

Free to turn around the nut is a lever-handle carrying a pawl to enter notches formed around the exterior of the nut, and by this pawl the nut can be turned in either direction, and so move the bar M endwise. This movement raises or lowers the link L, and so raises or lowers that end of the rod H. The link L has a small block jointed to it, through which the rod H passes and is free to slide, so that the link can be raised or lowered without giving any endwise movement to the rod H.

By the above arrangement either end of the rod H can be raised or lowered by the driver standing on the platform at the end of the implement. Other arrangements for raising or lowering either end of the rod may, however, be adopted. The movement given to the legs G also gives the requisite movement to the digging-forks. In the arrangement shown in the drawings there are two forks working with each leg. The stems O O of the forks are pivoted at O' to levers P, which turn on fulcrums at the lower part of the legs. The opposite ends of the levers P are connected by links to pins Q, carried by lever-arms on an axis, R, which passes from end to end of the machine. On the end of the axis is a lever-arm, which can be clamped in any desired position to a quadrant, R'. By this means the pins Q, which are coupled by links to the levers P, can be set higher or lower, and the depth to which the forks are caused to dig can thus readily be varied. The ends of the levers P are also connected by links S to two other links, T T, one of which is coupled to the upper ends of the fork-stems, and the other to the upper end of the legs G; or the upper ends of the stems of the forks might be coupled directly by links to the legs or to the framing of the machine.

By the means above described the legs G, as they descend, cause the forks to penetrate the ground nearly in a vertical position. So soon as the legs take a firm bearing on the ground and are rocked on their fulcrums, as above described, to move the machine forward, the stems of the forks are by the links connected to their upper ends caused to turn on their fulcrums O' and brought into an inclined position, thereby moving the forks backward away from the machine, and causing them to turn over the spit of ground which is behind them.

In place of the forks being carried by stems, as shown, the fork-teeth might all be secured to a rocking axis carried by each lever P, and each axis have an arm standing up from it, by which it can be rocked.

Having thus described the nature of my invention, and the manner of performing the same, what I claim is—

1. The combined arrangement of digging-machine, consisting of a steam-boiler and engine, propelling-legs G, ranged along one side of the machine, movable rod H, for varying the position of the fulcrums of these legs, and a series of digging-forks worked together with the legs, substantially as described.

2. The combined arrangement of supporting and propelling legs G, with movable fulcrums I', and rod H, for varying the positions of the fulcrums, substantially as described, for supporting and propelling agricultural implements.

3. The combined arrangement of supporting and propelling legs G and digging-spades or forks working therewith, substantially as described.

T. C. DARBY.

Witnesses:
WILMER M. HARRIS,
JNO. DEAN,
Both of No. 17 Gracechurch Street, in the city of London.